(12) United States Patent
Augustyniak

(10) Patent No.: US 10,549,855 B2
(45) Date of Patent: Feb. 4, 2020

(54) AIRLINER OVERHEAD MEALS DELIVERY

(71) Applicant: Marian Zdzislaw Augustyniak, New York, NY (US)

(72) Inventor: Marian Zdzislaw Augustyniak, New York, NY (US)

( * ) Notice: Subject to any disclaimer, the term of this patent is extended or adjusted under 35 U.S.C. 154(b) by 0 days.

(21) Appl. No.: 15/731,535

(22) Filed: Jun. 26, 2017

(65) Prior Publication Data

US 2018/0370634 A1 Dec. 27, 2018

(51) Int. Cl.
*B64D 11/00* (2006.01)

(52) U.S. Cl.
CPC ................ *B64D 11/0007* (2013.01)

(58) Field of Classification Search
CPC ..... A47F 3/00; A47F 9/00; E04H 3/04; E01B 25/30; E01B 25/32; B60L 13/00; B60L 13/006; B60L 13/06; B64D 9/00; B64D 11/00; B64D 11/0007; B65G 7/20; B65G 47/60; B65G 23/23; B65G 54/02; F16G 13/00; F16G 13/02; F16G 13/04; F16G 13/06; F16G 13/07; F16G 13/08; F16G 13/10; F16G 13/12; F16G 15/00; F16G 15/04
USPC .......... 186/38–51; 414/679; 104/89, 130.02, 104/281, 282, 284; 244/118.5, 137.1; 198/465.4, 485.1, 619; 187/269, 227, 187/289, 261; 59/78, 85; 296/22, 156, 296/178
See application file for complete search history.

(56) References Cited

U.S. PATENT DOCUMENTS

| | | | | | |
|---|---|---|---|---|---|
| 3,102,607 | A | * | 9/1963 | Roberts | B61D 37/00 186/40 |
| 3,179,208 | A | * | 4/1965 | Umanoff | A47B 31/06 186/40 |
| 3,848,703 | A | * | 11/1974 | Rundle | B66F 9/07 187/226 |
| 3,924,537 | A | * | 12/1975 | Matsui | B60L 13/03 104/282 |
| 3,999,630 | A | * | 12/1976 | McPhee | B64D 11/0007 186/40 |
| 4,022,404 | A | * | 5/1977 | Greiss | B64D 11/0007 186/40 |
| 4,197,934 | A | * | 4/1980 | Matsui | B61B 13/04 104/287 |
| 5,031,861 | A | * | 7/1991 | Wojdylo | B64D 11/0007 186/40 |
| 5,205,515 | A | * | 4/1993 | Luria | B64D 11/0007 186/40 |
| 5,415,250 | A | * | 5/1995 | Rojas | B64D 11/0007 186/40 |

(Continued)

*Primary Examiner* — Jeffrey A Shapiro
(74) *Attorney, Agent, or Firm* — Harness, Dickey & Pierce, P.L.C.

(57) ABSTRACT

Abundant space above an airliner's ceiling lends itself well for replacement of a single food cart blocking aisles with overhead conveyance of passengers' meals. A linear levitating motor for quaintness and easy controls, in fastened to airplane's structure track system, is a motive element. By movements of the motor's mover and attached to it elevator meals are delivered to passengers at several points simultaneously. Overhead moving trays holders are lowered over the center aisles for distribution of meal trays by attendants, and elevated to return to the galley for new load. Same system is used to collect discards.

9 Claims, 3 Drawing Sheets

(56) References Cited

U.S. PATENT DOCUMENTS

| | | | | |
|---|---|---|---|---|
| 5,803,418 A * | 9/1998 | Bringolf | | E04C 3/005 |
| | | | | 248/158 |
| 6,322,472 B1 * | 11/2001 | Schulze-Beckinghausen | | |
| | | | | B66F 3/06 |
| | | | | 474/155 |
| 6,412,603 B1 * | 7/2002 | Nervig | | B64D 9/003 |
| | | | | 187/267 |
| 6,450,318 B1 * | 9/2002 | Minardi | | B66C 11/06 |
| | | | | 198/346.3 |
| 6,494,404 B1 * | 12/2002 | Meyer | | B64C 39/02 |
| | | | | 244/118.1 |
| 6,644,441 B1 * | 11/2003 | Ebrahimi | | B64D 11/0007 |
| | | | | 186/40 |
| 7,921,512 B2 * | 4/2011 | Michel | | B64D 11/0023 |
| | | | | 16/102 |
| 8,864,079 B2 * | 10/2014 | Sankrithi | | B64D 9/00 |
| | | | | 212/74 |
| 9,284,054 B2 * | 3/2016 | Saint-Jalmes | | B64D 11/00 |
| 9,706,860 B2 * | 7/2017 | Li | | A47F 10/06 |
| 2003/0221916 A1 * | 12/2003 | Dube | | B66F 11/04 |
| | | | | 187/391 |
| 2007/0022730 A1 * | 2/2007 | Iwami | | F16G 13/16 |
| | | | | 59/78.1 |
| 2008/0087767 A1 * | 4/2008 | Scott | | B64D 11/0007 |
| | | | | 244/118.6 |
| 2009/0243413 A1 * | 10/2009 | Gilchrist | | H02K 7/09 |
| | | | | 310/90.5 |
| 2013/0015039 A1 * | 1/2013 | Murakami | | B65G 35/06 |
| | | | | 198/468.8 |
| 2013/0199402 A1 * | 8/2013 | Ansar | | B61B 3/02 |
| | | | | 104/91 |
| 2013/0240300 A1 * | 9/2013 | Fagan | | B66F 3/46 |
| | | | | 187/210 |
| 2015/0014481 A1 * | 1/2015 | Vandewall | | B64D 11/0007 |
| | | | | 244/118.5 |
| 2016/0214799 A1 * | 7/2016 | Walter | | B65G 37/02 |
| 2016/0257495 A1 * | 9/2016 | Reed | | B65G 13/073 |
| 2016/0286987 A1 * | 10/2016 | Li | | A47F 10/06 |
| 2017/0101182 A1 * | 4/2017 | Brown | | B64D 11/0007 |

* cited by examiner

AIRLINER OVERHEAD MEALS DELIVERY

CROSS-REFERENCE TO THE RELATED APPLICATIONS

None

STATEMENT REGARDING FEDERALLY SUPPORTED RESEARCH

There is No Federally Supported Research

BACKGROUND OF THE INVENTION

Currently the airliners in flight delivery of meals is by the attendants who push a cart along the aisle and serve passengers trays with meal contents. In addition attendants fulfill passengers' requests for a specified drink. Serving meals this way is cumbersome, slow, hampers and interferes with passengers' comfort and movement in the aisles. The circulation in the aisles is severely restricted by the cart size which uses the entire aisle. It is also a costly procedure for the airliners' operators. The serving duration depends on the number of passengers and proficiency of the serving personnel. It may be one hour or more. The food is haphazardly deposited in the trays, each item separately wrapped or in own container. The passenger is compelled to juggle each item in a very confined space, what is prone to mishaps, spilled liquids, and overturned containers so that their contents are deposited on passenger or neighbor. After the meals finished, the attendants come again with the cart to collect the food trays, remaining containers and utensils. In addition, attendants often make another round to collect not previously returned meal items.

In consequence, the improvement in airline meals delivery serving is overdue.

It behooves to recall that it took more than a century to invent turned up airplane wing tips, winglets, to reduce vortex.

The herein submitted embodiment of technology comprises delivery of meals to the passengers of an airplane and for loads to designated locations by herein presented overhead transport.

Alternative Embodiments of the Invention

Some of the alternate embodiments are delivery of plurality of applications comprising: parts assembly-requiring delivery from different places and of different materials and parts to specified location including assembly lines, and applicable in parts assembly, in office distribution, or collection of mail and other items to individual or selected places. It may replace surface transport by erection of the portable ground or aerial track supports for movement of the cargo, like luggage between airplane and passengers.

SUMMARY OF THE INVENTION

This invention preferred embodiment and intent is the elimination and replacement of the currently employed in the airliners meal service system. Which service consists of attendants pushing a food loaded carts along and filling the entire aisle, stopping and delivering the meal to individual passengers. The herein proposed embodiment of providing food service is more efficient, reliable and less time consuming, avoids discomfort and nuisance to passengers and airplane crews. It fulfills a paramount need for the improved quality of air travel and more efficient functioning of the airline operators, as well as the increased comfort of the passengers.

This embodiment comprises installation of the food conveyor in form of a track system above the center aisles. The tracks originate in the galley, go over the central aisle, turns around and returns to the galley. The tracks are fastened firmly to the airplane frame. On the tracks, the meals are carried from the galley to the individual passengers efficiently, without interference and inconvenience to other passengers and the crews.

The tracks are equipped with a linear magnetic levitation motor for efficiency and quietness. The controls of the motor are electronic, for example: Bluetooth, or Wi-Fi, in addition to safety devices. Part of linear magnetic levitation motor, here in called mover, moves between magnets and coils and levitates above the levitating magnet on each side of the continuous slot. When the mover arrives at preset location, such as a row of seats, it turns off the forward track onto a cross track and stops and elevator is lowered to allow other movers on forward and return tracks to continue. When mover arrives at the set location the attendants signal attached to the mover elevator to lower the trays holder, remove the food trays and serve them to the individual passengers. After the removal of the trays attendants cause the elevator to retract upward. The mover with the empty trays holder turns to the return track toward the galley for new load. At the galley attendants fill again or replace empty tray holder with one loaded, designate new address location and the service repeats. In provision for diversified requirements, the elevator is presented herein in three embodiments:

Preferred embodiment of the elevator is an Augustyniak rigid chain, which is rigid in straight line when, for example, lowered with load and flexible when being wound on the shaft. Said chain comprises links made up of inner and outer plates with holes for pins. Each plate pair is separated by tube trough which, and the holes, are inserted pins holding the plates together. The inner plates, although it may be applicable to both, the inner and outer plates, at one end terminate with a convex form at the other with concave form. When in straight line, the convex end fits into the concave, thus locking the chain. The winding up of a chain creates angle and the convex and concave ends disengage, removing the rigidity of the chain.

Another elevator embodiment, when needed, a telescoping tubes elevator embodiment comprises tube segments fitting one into another, with restraining stops at ends. The widest, top segment is attached to the mover elevator plate, to which attached is speed controlled winding motor with shaft to which attached is line for winding the end telescoping elevator plate and attached to it telescoping tubes and trays holder. On arrival at the specified location the mover enters cross track, stops, and the elevator is lowered from its high, position by gravity of own weight and the load, thereafter elevator may deposit and disconnect the load and return to raised position as programmed. In this embodiment, the attendants remove and deliver trays from trays holder to passengers and send elevator to raised position and mover, upon sensors' signal of clear entry, enters the return track.

Still another elevator embodiment, when needed, wherein the scissors elevator is in a form of the scissors mechanism comprising of rigid metal or plastic crisscrossed bars, fastened at ends and centers with, and rotating about pins. The crisscrossed bars are fastened at both ends to the plates. The elevator bears load in contracted position. With the load release scissors elevator expands and lowers the load. Attached to elevator plate winding motor winds the attached to its shaft cable controlling contraction and expansion of the scissors. This novel application lowers the load by gravity of its own weight and releases tension in the scissors' bars. On signal, the elevator is lowered from elevated position, stops upon reaching the specified location. Thereafter it may deposit and disconnect the load and contract to elevated position, or as controlled by the attendants, sent to elevated position and upon sensors' signal of clear entry the attached to it mover enters the return track.

DESCRIPTION OF THE DRAWINGS

1/3 Sheet

2/3 Sheet

Figure 1:
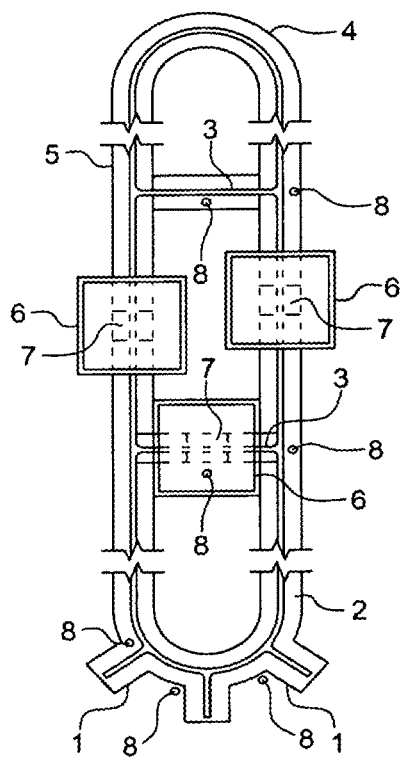
FIG. 1 is the plan for overhead track, indicating, among other items, its layout, cross connections and spurs at the galley for loading meals onto the trays holder, which is then sent on its way by the operation of the control devices.
Figure 2:
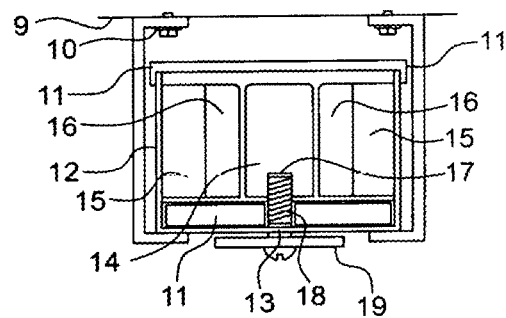
FIG. 2 is a cross section of the track, indicating, among other items, arrangements of the magnetic levitation motor within the track, the track attachment to the airplane structure, the track top cover, the elevator plate attached to the mover magnet-rotor.
Figure 3:
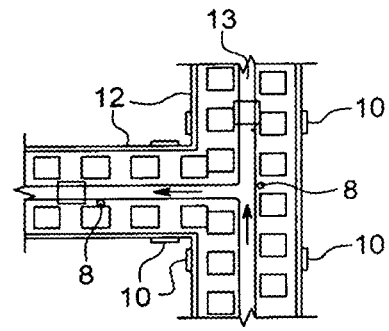
FIG. 3 is a detail of the track plan, indicating, among other items, slots arrangement for turn of a mover, through the continuous slot in track, to or from cross tack, further illustrated in section FIG. 2-FIG. 2.
Figure 4:
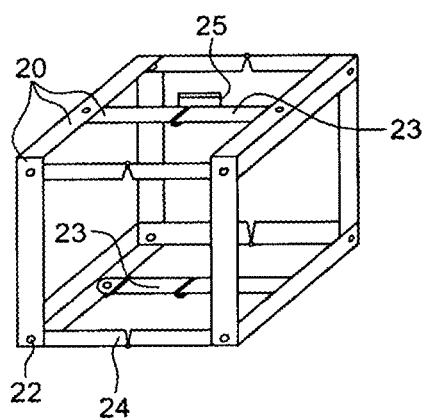
FIG. 4 is the trays holder, a frame in form of a cage with plurality of spaces for insertion of prepared food trays. The top of the tray holder contains attachment to the elevator. The tray holder is collapsible for space serving while it is unused by the hinged connections and structure.
Figure 5:
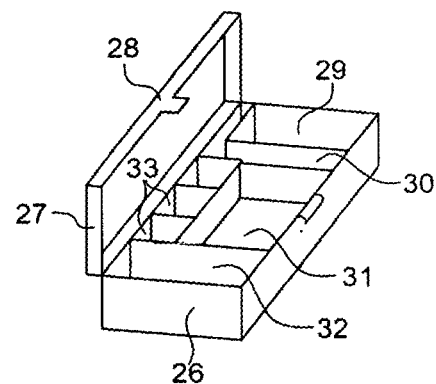
FIG. 5 is a food tray to be fitted into the trays holder. It contains compartments for variety of food, utensils, and liquids. When loaded and in transit its cover is closed.
Figure 6:
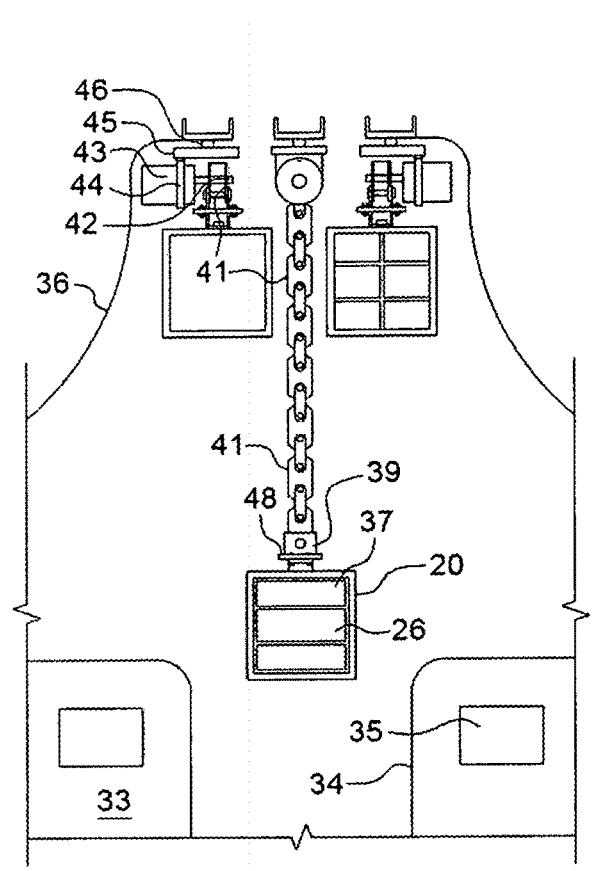

The preferred embodiment is the Augustyniak rigid chain elevator. FIG. 6 shows an arrangement and relationships of the herein presented overhead track system and the interior of the airliner, including ceiling, menu, aisles, and seats. Augustyniak rigid chain elevator is attached to the shaft of the winding motor which is attached to mover and terminates at the attachment for the trays holder. When, at specified location the mover enters cross track and stops, the elevator is lowered for removal of trays, as shown, while movers with trays holders on forward and return tracks continue in elevated position.

Figure 7:
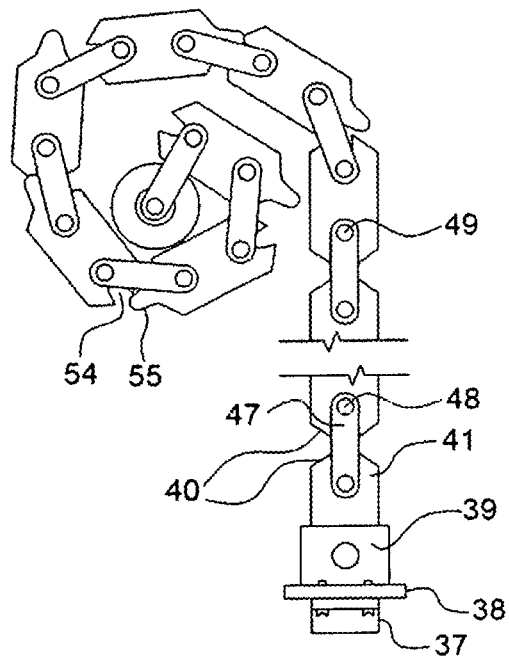

FIG. 7 shows detailed Augustyniak rigid chain elevator of FIG. 6. It is composed of outer and inner plates parallel, separated by separator tubes, and held together by, and free to rotate about pins. Augustyniak rigid chain is attached to the shaft of the winding motor attached to elevator plate, which is attached to the mover. The shape of inner plate is in form of convex form with sloped sides, and other end is in form of concave with sloped sides. In straight line these two of neighboring ends lock and make the Augustyniak rigid chain rigid. The outed plate may be identical with the inner plate.

Figure 8:
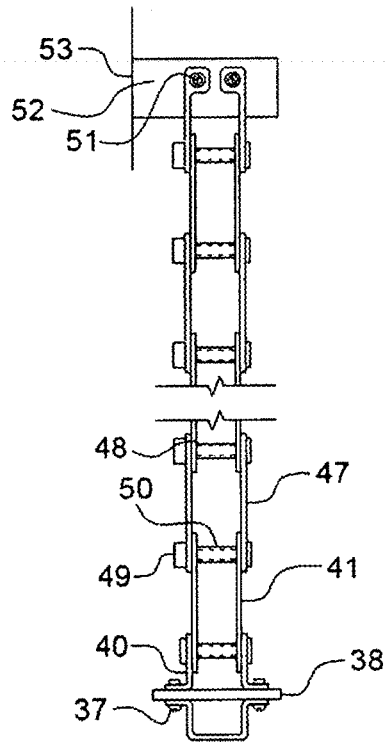

FIG. 8 shows the Augustyniak rigid chains elevator sideways view, attachment to the winding motor shaft and attachment to the end elevator, to which trays holder is also attached.

3/3 Sheet

Figure 9:
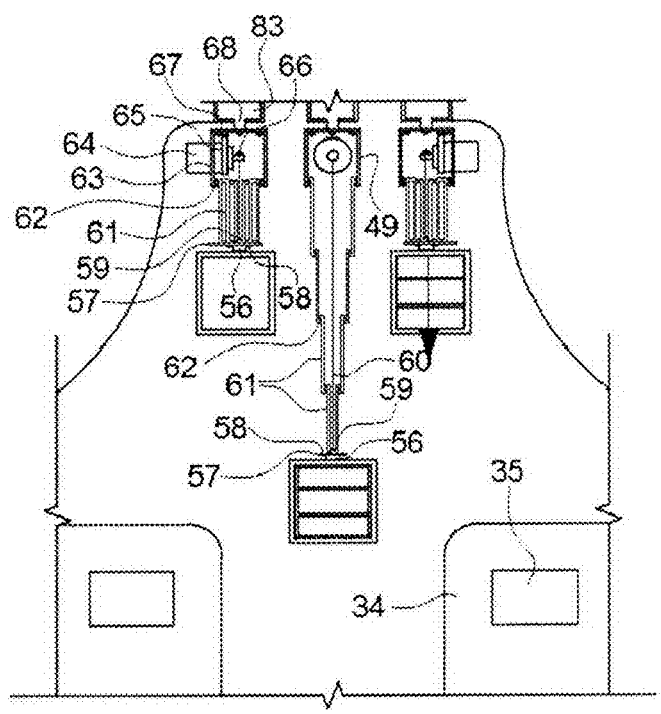

FIG. 9 shows an arrangement and relationships of the herein presented overhead track system and the interior of the airliner, including ceiling, menu, isles, and seats.

Another embodiment of the elevator is the telescoping tubes type. In the drawing center the elevator tubes are telescoping out downward to bring the attached trays carrier containing food trays to facilitate their distribution to passengers. To the right of the telescoped elevator is elevator telescoped in, with loaded trays carriers on forward track. On the left is said elevator with empty trays holder on return track. A line attached to the end telescoping plate winds it on winding motor shaft.

Figure 10:
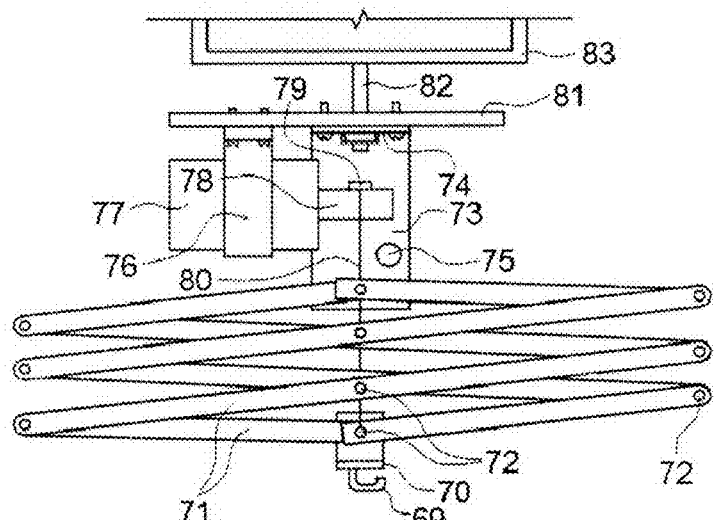

FIG. 10 shows still another embodiment of the elevator, which is the scissors type. To the attached to the mover elevator plate is attached winding motor and shaft with line extending to scissors end elevator plate. The scissors plate provides support for the scissors plurality of bars joined at ends and centers for contraction and expansion. The scissors type elevator can be oriented to fit available space.

DETAILED DESCRIPTION OF THE INVENTION

The embodiment of the present disclosure of an airline's meals delivery comprises of: the following main parts:
Galley
Track
Trays holder
Trays
Motor
Elevator

Galley

In the airline meal service the meal preparedness on the outside, are stored in the airliner's storage and galley. Passenger registers the choice of menu on the screen at own seat, or other way. In the galley the attendants make final preparation of trays, augmenting them with variations as per passenger's request, such as choice of drink. Attendants load the plurality of ready trays into unfolded from a flat storage state trays holder. Then, the attendants signal to lower the elevator and attach the tray holder to the elevator. The attendants electronically enter on the board the address of the designated location, and signal to retract elevator upward. When sensors indicate free to proceed, the mover re-enters track and is on the way to designated location. The attendants proceed to the next load preparation. As the elevator arrives at the destination it enters cross track and stops. Attendants lower the elevator and distribute the trays among consumers. Distribution accomplished, the attendant causes the elevator to elevate and, upon signal of unobstructed way, move on a return track toward the galley.

Track

The herein presented embodiment of meals delivery to the airliners' passengers comprises an installation and use of an overhead track assembly. In this embodiment, forward and return tracks are connected by cross tracks at which mover stops and brings elevator to lower the trays holder for distribution of trays. At the end forward track makes a U-turn to a return track and continues on the other side of the aisle back to the galley. The forward part of the track originates in the galley where are spurs to accommodate the attachment to the elevator of prepared trays holders, said elevator continues on forward track above one side of the airline center aisle to the established point, moves to cross track for delivery of load there. Fastened to the airplane's structure, the track of rigid material is nonmagnetic, of configuration to accommodate linear magnetic levitation motor, fastenings of the said motor and a continuous slot for attachment of elevator to said motor's magnet-rotor, herein called mover. The location at the cross track and elevator lowering of the trays holders makes a space that permits free movement on the forward and return tracks. From cross track, upon attendants' signal, and sensors indicate free movement, mover enters return track for return to the galley.

Trays Holder

The trays holder is a container for trays. It is of skeletal form capable of being folded for storage. The sides and entire structure comprise of metal or plastic angle like bars joined top and bottom at the ends with hinged cross bars. In the center top another hinge has attachment to the elevator. Closing the hinges folds the trays holder flat for space reduction and storage. When the tray holder loaded with trays at the galley is ready, the attendant attaches it the brought down elevator, enters the destination, sends the elevator and trays holder on the way. In preferred embodiment, for safety the attendants cause the elevator to lower trays holder, and distributes its content, the trays. In other instances the elevator delivers the trays or similar items to the deposition point disengages the load, returns to parking position and mover moves to the return track.

The tray holder can be re-formed to serve also as used trays collector and other discards.

Food Trays

The disposable plastic food trays and trays holder shapes and sizes are coordinated to fit efficiently and securely. In the preferably rectangular trays, the major food items are deposited directly into particular compartments to eliminate individual packaging, a zipper, snap or similar closing device permits the lid to be held vertically against spills, and be capable of closing after the passenger finished the repast.

Linear Magnetic Levitating Motor

The track contains motive force, selected to be a linear magnetic levitation motor for delivery of loads to selected locations on the track. The said motor provides the smooth and quiet movement without significant contribution to the already existing noise. In this novel embodiment the said motor's speed, stop-start and other operations are controlled by installed electronic control system, such as for example Bluetooth, Wi-Fi, and safety devices. The linear magnetic levitation motor comprises: levitating magnet, plurality of electromagnetic coils, magnet-stator, and a rotor, secondary part of motor, herein called mover. The mover is of cross-section magnet suitable to accommodate the changes of the track, cross-connections and spurs, moves above levitating magnet, continuous slot in the track, through which it has attachment for the elevator plate. At the designated points, such as the cross track connection, spurs or any other location, are control devices for mover changes of direction, elevator in lowered position, clearing the forward and return tracks to permit unhampered movement of other movers. In this embodiment attached to mover elevator carries loads, tray holders from the galley to designated location. On the attendants' signal, attached to the mover elevator lowers the attached trays holder to a set height and stops. The attendants remove and serve the trays from trays holder to the passengers. Serving finished, the attendants cause the elevator to elevate and mover to proceed to the return track when the sensors indicate free entry.

Elevator

In this preferred embodiment attached to the mover is an elevator for lowering and elevating attached at galley trays holders. When mover brings the elevator to the designated location it stops. In other embodiments the elevator may deposit and detach the load and return. For safety in preferred embodiment the attendant controls the elevator after the mover stops. The attendants signal the elevator to lower the load for disposal of it, and upon accomplishing this task send the elevator up, and the mover enters the return track.

There are different specific needs for of the herein described elevator. In provision for diversified requirements for the applications, the elevator here is presented in plurality of different embodiments comprising:
Augustyniak rigid chain elevator
Telescoping tubes elevator
Scissors elevator

Augustyniak Rigid Chain Elevator

The preferred embodiment of the said elevator, Augustyniak rigid chain elevator comprises a chain which is rigid in straight line when in tension as for example lowered with load, and flexible when being wound on the motor shaft. The Augustyniak rigid chain elevator comprises also of safety device, elevator plate with attachment to the mover, attached to the plate motor and shaft which winds or un-winds attached to the shaft said chain. The downward movement is assisted by gravity. At the other end of the Augustyniak rigid chain is attached plate with attachments for the load, in this embodiment the trays holder.

The Augustyniak rigid chain comprising parallel pairs of plastic or metal flat plates, outer and inner, with round holes for pins about which pins the plates turn, each pair of plates is separated by rollers and held by said pins. Each inner plate has convex shape at one end and concave at other. In the straight line convex end of one plate fit into the concave end of the next plate. The plates meshing locks the chain making it rigid, similar to rod and prevents the Augustyniak rigid chain bending either front or back. The outer plates may be of identical shape as inner plates and work identically. Because the flat sides of the inner and outer plates are by their shape and connection rigid already, the entire chain becomes wholly rigid. When the said chain is being coiled, the convex and concave inner plate's ends assume an angle with each other and separate enabling coiling the fastened to the motor shaft chain. With application of the new invention, the entire chain in the straight position is completely rigid. The rigidity in all directions is required to prevent movement of the items where there is turbulence, uneven speed of movement and any motion that may cause adverse effects on loads . . . Other applications of this embodiment are applicable to divers other uses, such as lifting materials in limited space, width and height, vibrations and deleterious environmental conditions.

Telescoping Tubes Elevator

The telescoping tubes elevator comprises tubular segments fitting one into another with slide-able strips and tube segment stops at ends. The widest, top segment is attached to the elevator plate, which is attached to mover. To the elevator plate is attached speed controlled winding motor with shaft to which attached is line for winding the end telescoping elevator plate and attached to it telescoping tubes. On arrival at the specified location the mover stops, and the elevator is lowered from its elevated position by gravity of own weight and the load Thereafter, it may deposit and disconnect the load and return to elevated state as programmed, or in this embodiment the attendants remove the trays from lowered and stopped trays holder and deliver to passengers, and send elevator to the elevated position and upon sensors' signal of clear entry move renters the return track.

The Scissors Elevator

The scissors elevator is in a form of the scissors mechanism comprising rigid metal or plastic crisscrossed bars, fastened at their ends and centers with, and rotating about pins. The ends of the crisscrossed scissors assembly are fastened to the scissors end plate The scissors elevator comprises safety device, elevator plate attached to the mover, to the elevator plate attached motor of which shaft winds attached to it line. The other end of the line is attached to scissors end plate, to which are also attached scissors bars, and attachments for the load, in this embodiment the trays holder. In this novel embodiment the scissors elevator carries load in contracted, elevated position, and extends to lower the load to be removed. This novel application lowers the load by gravity of its own weight and load, releases tension in the scissors' bars. On attendants signal, the elevator is lowered from elevated position and stops upon reaching the specified level. Thereafter it may deposit and disconnect the load and elevate, or as controlled by the attendants after removal of trays send to elevated position and upon sensors' signal of clear entry the mover enters the return track.

The embodiments of the invention in which an exclusive property or priviledge is claimed are defined as follows:

1. An airliner overhead meals-delivery assembly for an aircraft cabin comprising a ceiling, a floor, a galley section, and a passenger section, said assembly comprising:
   a non-magnetic track enclosed by a cover but for a continuous slot in a bottom surface thereof;
   a mover partially received within the continuous slot and comprising an elevator plate;
   at least one elevator coupled to the elevator plate;
   at least one tray holder coupled to the elevator;
   a conveyance system;
   an electronic control system;
   a plurality of tracking sensors coupled to the track;
   the track comprises a looped portion, at least one spur portion, and at least one cross portion;
   the at least one elevator comprises a fixed end and an actuation end;
   the track being mounted across the ceiling;
   the looped portion traversing from the galley section, around the passenger section, and back to the galley section;
   the at least one spur portion being positioned within the galley section;
   the at least one spur portion extending out of the looped portion;
   the at least one cross portion being positioned within the passenger section;
   the at least one cross portion extending across the looped portion;
   the mover being movably engaged along the track;
   the conveyance system being operatively integrated along the track, wherein the conveyance system is used to guide the mover along the track so that the mover extends across the continuous slot;
   the at least one elevator being a rigid chain elevator comprising a single chain comprising a plurality of chain links and a winding motor, each of the plurality of chain links being serially and hingedly connected to an adjacent link from the plurality of chain links, an output shaft of the winding motor being terminally connected to a last link from the plurality of chain links, the fixed end being a first link from the plurality of chain links; and the actuation end being the last link from the plurality of chain links;
   each of the plurality of chain links comprises an outer plate and an inner plate, the outer plate of an arbitrary link being hingedly and adjacently connected to an inner plate of the arbitrary link, wherein the arbitrary link is from the plurality of chain links, and the inner plate of the arbitrary link being hingedly and adjacently connected to the outer plate of a subsequent link, opposite to the outer plate of the arbitrary link, wherein the subsequent link is from the plurality of chain links;
   the inner plate comprises a concave portion and a convex portion, the concave portion and the convex portion being positioned opposite to each other across the inner plate, the inner plate of the arbitrary link and the inner plate of the subsequent link being linearly aligned to each other, and the convex portion of the arbitrary link being engaged into the concave portion of the subsequent link;
   the fixed end being mounted to the mover via the elevator plate; the actuation end being mounted to the at least one tray-holder; the electronic control system being communicably coupled to the conveyance system and the at least one elevator;
   the mover and the conveyance system being configured from a linear magnetic levitation motor, said motor being disposed within the track;
   the linear magnetic levitation motor comprises a first stator magnet, a second stator magnet, a rotor magnet, and a plurality of armature coil units;
   the first stator magnet and the second stator magnet being mounted offset from each other across and within the track;
   a first levitation magnet disposed within and spanning across the continuous slot and disposed between the first stator magnet and the second stator magnet;
   the fixed end being mounted onto the rotor magnet;
   the plurality of armature coil units being distributed along the track;
   the cover and the track being configured to be nonmagnetic;
   the cover being made of a rigid material;
   the cover being mounted across the track;
   the slot traversing through the cover;
   the slot continuously traversing along the track, within the at least one spur, and within the at least one cross portion;
   the fixed end being positioned through the slot;
   the plurality of tracking sensors being operatively integrated along the track, wherein the plurality of tracking sensors is used to monitor movement of the mover; and
   the plurality of tracking sensors being communicably coupled to the electronic control system.

2. The airliner overhead meals-delivery assembly as claimed in 1 comprises:

the at least one tray holder comprises a first lateral frame, a second lateral frame, and a plurality of hinged crossbars; and the first lateral frame and the second lateral frame being mounted offset from each other by the plurality of hinged crossbars.

3. The airliner overhead meals-delivery assembly as claimed in 2 wherein the first lateral frame is configured from a first plurality of angle members.

4. The airliner overhead meals-delivery assembly as claimed in 3 wherein the second lateral frame is configured from a plurality of angle members.

5. The airliner overhead meals-delivery assembly as claimed in 1 comprises:

at least one food tray;

the at least one food tray being sized to fit inside the at least one tray holder; and the at least one food tray being mounted into the at least one tray holder.

6. The airliner overhead meals-delivery assembly as claimed in 5 comprises:

the at least one food tray being shaped as a rectangular prism.

7. The airliner overhead meals-delivery assembly as claimed in 3 comprises:

the at least one food tray being configured with a plurality of compartments to separate different kinds of food content.

8. The airliner overhead meals-delivery assembly as claimed in 1 comprises:

at least one safety sensor;

the at least one safety sensor being operatively integrated into the at least one elevator, wherein the at least one safety sensor is used to monitor movement of the at least one elevator; and the at least one safety sensor being communicably coupled to the electronic control system.

9. The airliner overhead meals-delivery assembly as claimed in 1 comprises:

each of the plurality of chain links comprises an outer plate and an inner plate; the outer plate of a preceding link being hingedly and adjacently connected to an inner plate of the preceding link, wherein the preceding link is from the plurality of chain links; and the inner plate of the preceding link being hingedly and adjacently connected to the outer plate of an arbitrary link, opposite to the outer plate of the preceding link, wherein the arbitrary link is from the plurality of chain links.

* * * * *